United States Patent [19]

Treen

[11] Patent Number: 4,495,567
[45] Date of Patent: Jan. 22, 1985

[54] MULTIPROCESSOR/MULTIMEMORY CONTROL SYSTEM

[75] Inventor: Kevin L. Treen, North Attleboro, Mass.

[73] Assignee: Codex Corporation, Mansfield, Mass.

[21] Appl. No.: 311,743

[22] Filed: Oct. 15, 1981

[51] Int. Cl.³ .............................................. G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,242,467 | 3/1966 | Lamy | 364/200 |
| 3,510,844 | 6/1970 | Aranyi et al. | 364/200 |
| 3,665,487 | 5/1972 | Campbell et al. | 364/200 |
| 3,710,349 | 1/1973 | Miwa et al. | 364/200 |
| 3,753,234 | 9/1973 | Gilbert et al. | 364/200 |
| 3,761,879 | 9/1973 | Brandsma et al. | 364/200 |
| 3,787,818 | 1/1974 | Arnold et al. | 364/200 |
| 3,810,114 | 5/1974 | Yamada et al. | 364/200 |
| 3,905,023 | 9/1975 | Perpiglia | 364/200 |
| 3,916,383 | 10/1975 | Malcolm | 364/200 |
| 3,940,743 | 2/1976 | Fitzgerald | 364/200 |
| 3,984,818 | 10/1976 | Gnadeberg et al. | 364/200 |
| 4,037,210 | 7/1977 | Sharp | 364/900 |
| 4,047,162 | 9/1977 | Dorey et al. | 364/200 |
| 4,067,059 | 1/1978 | Derchak | 364/200 |
| 4,096,571 | 6/1978 | Vander Mey | 364/200 |
| 4,099,233 | 7/1978 | Barbagelata et al. | 364/200 |
| 4,099,236 | 7/1978 | Goodman et al. | 364/200 |
| 4,115,851 | 9/1978 | Nagano et al. | 364/200 |
| 4,123,794 | 10/1978 | Matsumoto | 364/200 |
| 4,130,865 | 12/1978 | Heart et al. | 364/200 |
| 4,164,787 | 8/1979 | Aranguren | 364/200 |
| 4,170,038 | 10/1979 | Bouvier et al. | 364/200 |
| 4,181,936 | 9/1977 | Kober | 364/200 |
| 4,228,496 | 10/1980 | Katzman et al. | 364/200 |
| 4,237,534 | 12/1980 | Felix | 364/200 |
| 4,368,514 | 1/1983 | Persaud et al. | 364/200 |

*Primary Examiner*—James D. Thomas
*Assistant Examiner*—William G. Niessen

[57] ABSTRACT

Apparatus for regulating access by each of a plurality of asynchronous data processors to each of a plurality of memories, each processor being associated with one of the memories and needing both read and write access to its own memory and to the processor's memories, the apparatus including local bus circuitry to selectably permit each processor to have, or to prevent each processor from having, access to its associated memory, connecting bus circuitry to selectably permit each processor to have, or to prevent each processor from having, direct access to the other processors' memories, and control circuitry for giving each requesting processor access over the connecting bus to another processor's memory, and for giving each processor access over the local bus circuitry to its own memory except when access to its own memory is being given to another one of the processors.

9 Claims, 3 Drawing Figures

4,495,567

MULTIPROCESSOR/MULTIMEMORY CONTROL SYSTEM

BACKGROUND OF THE INVENTION

This invention relates to regulating access by multiple processors to multiple memory elements in a data processing system.

In a multi-memory, multi-processor data processing system, access by the processors to the memory elements must be regulated to avoid conflicts.

SUMMARY OF THE INVENTION

The invention features apparatus for regulating access by each of a plurality of data processors to each of a plurality of memories, each of the processors being associated with one of the memories, each of the processors needing access to its associated memory and to the memory associated with each other of the processors, the apparatus comprising local bus circuitry connected to selectably permit each of the processors to have, or to prevent each of the processors from having, access to its associated memory, connecting bus circuitry connected to selectably permit each of the processors to have, or prevent each of said processors from having, access to the memory associated with each other of the processors, and control circuitry connected to give each of the processors making a request access over the connecting bus circuitry to the memory associated with one other of the processors, and to give each of the processors access over the local bus circuitry to its associated memory except while access to the associated memory is being given to another of the processors.

In preferred embodiments, each of the processors has an associated internal control clock, and the control circuitry comprises hold triggering circuitry connected to stop said internal control clock of the processor making the request until the request has been satisfied, disconnect triggering circuitry connected to cause the processor whose associated memory is the subject of the request to disconnect itself from the local bus circuitry and to continue to operate its internal control clock to provide timing control pulses to the control circuitry, and timing circuitry connected to activate the connecting bus circuitry at least during part of the time when the internal control clock of the processor making the request is stopped and the processor whose associated memory is the subject of said request is disconnected from the local bus circuitry; each of the processors has a direct memory access pin, and a hold pin, and the control circuitry is connected to provide, when the request is made, a signal to the direct memory access pin of the processor whose associated memory is the subject of the request to cause the processor to disconnect itself from the local bus circuitry, and a signal to the hold pin of the processor making the request to cause the processor to wait until the request has been satisfied; arbitrate circuitry is included and is connected to cause the control circuitry to satisfy simultaneously issued requests of more than one of the processors in a predetermined order; the arbitrate circuitry comprises sampling circuitry connected to provide a signal when the simultaneously issued requests occur, bus enabling circuitry responsive to the sampling circuitry for satisfying the request of one of the processors, and reporting circuitry for signaling the one processor when its request has been satisfied to cause its associated memory to be made available to satisfy the request of another one of the processors; and there are two of said processors and two of said memories.

The invention enables each processor to operate independently at full speed, except when access to its associated memory is requested by another processor; each processor can directly and quickly access any other processor's memory; stalemates between simultaneously requesting processors are resolved; and each processor can perform any task using any of the memories, including diagnosis of failures in another processor.

Other features and advantages of the invention will be apparent from the following description of the preferred embodiment, and from the claims.

DESCRIPTION OF THE PREFERRED EMBODIMENT

We turn now to the structure and operation of the preferred embodiment, first briefly describing the drawings thereof.

DRAWINGS

STRUCTURE

Figure 1:
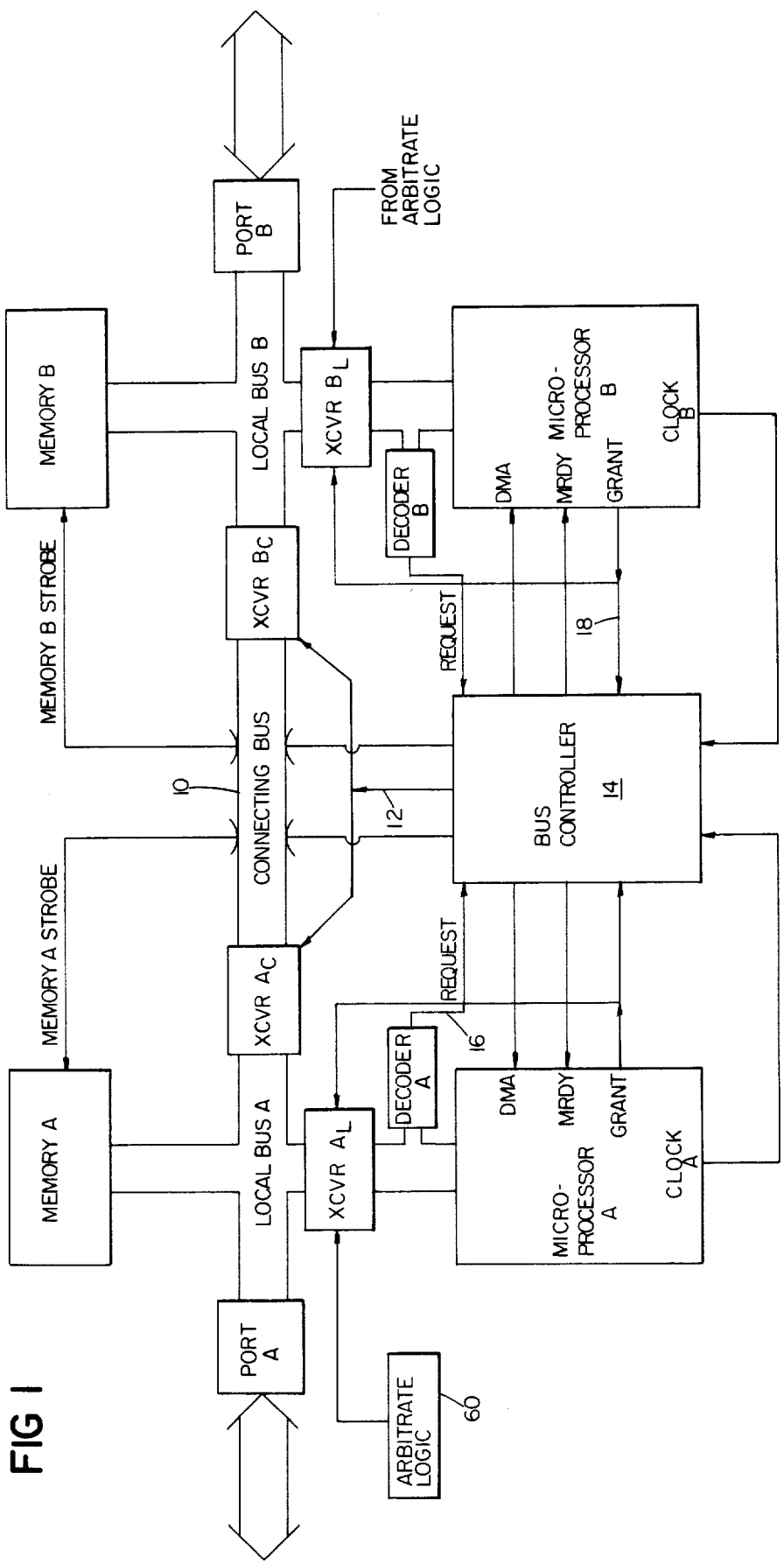
FIG. 1 is a block diagram of a two-processor, two-memory data processing system.

Referring to FIG. 1, each of microprocessors A and B is connected to its corresponding memory A or B (and its corresponding input/output port A or B) through its corresponding local bus A or B and through local transceivers $A_L$ and $B_L$, and to the local bus of the other microprocessor through connecting bus 10. Conventional bidirectional transceivers $A_C$ and $B_C$, which together open and close connecting bus 10, are connected by control line 12 to bus controller 14. Conventional bidirectional transceivers $A_L$ and $B_L$ respectively open and close local bus A and local bus B under the control respectively of microprocessors A or B, or of arbitrate logic 60. Bus controller 14 (which controls the receipt and execution of requests by each microprocessor to use the other's memory) is connected, as shown, to microprocessors A and B, conventional decoders A and B, and memories A and B.

Figure 2:
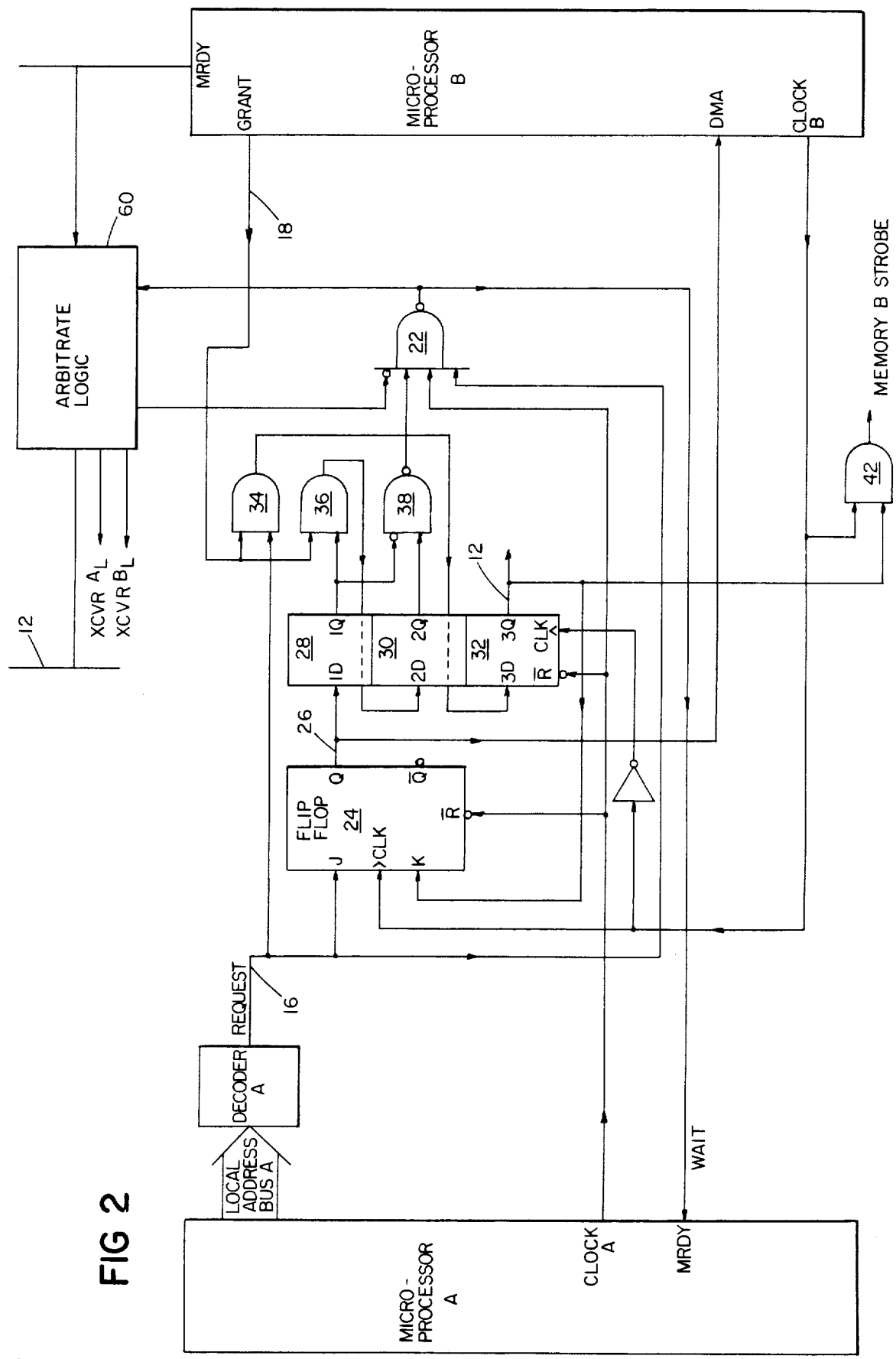
FIG. 2 is a block diagram of the two processors of FIG. 1 with representative circuitry (of the bus controller of FIG. 1) used to satisfy one processor's request for access to the other's memory.

Referring to FIG. 2, microprocessor A (needing access to memory B) is connected, as shown, to microprocessor B through flip-flops, gates and other circuitry which are part of bus controller 14. Decoder A is connected to provide a request signal on line 16 whenever an address appearing on local address bus A specifies a location in memory B. NAND gate 22 is connected to signal microprocessor A (on its memory ready (i.e., hold) input (MRDY)) to "stop" its internal control clock A beginning when a request signal appears and until the request has been satisfied.

Conventional J-K flip-flop 24 is arranged to signal microprocessor B on line 26 that a request signal has been received. Conventional D flip-flops 28, 30, 32 and gates 34, 36, 38 are connected, as shown, to provide control signals on line 12 to transceiver $A_C$ and $B_C$ to open and close connecting bus 10; to gate 22 to signal microprocessor A to restart its internal clock A when the request has been satisfied; and to AND gate 42 which provides control signals to enable memory B to be read or loaded (synchronously with internal clock B of microprocessor B) when connecting bus 10 is open. Flip-flops 24, 28, 30, 32 have their clock inputs connected to internal clock B of microprocessor B (which synchronizes the satisfying of microprocessor A's request) and their reset inputs to internal clock A of microprocessor A.

A second set of identical circuitry (not shown) in bus controller 14 receives and satisfies requests from microprocessor B for access to memory A. Arbitrate logic 60 (containing conventional circuitry including a gate, a D-flip flop and a free running oscillator) for sampling the lines to the MRDY inputs of memory processors A and B is connected as shown to line 12, gate 22, XCVR $A_L$ and XCVR $B_L$ to cause a request signal from microprocessor A to be processed first when both microprocessors simultaneously make requests.

OPERATION

Microprocessors A and B normally operate independently and without interruption at different processing speeds using their respective memories A and B.

Figure 3:
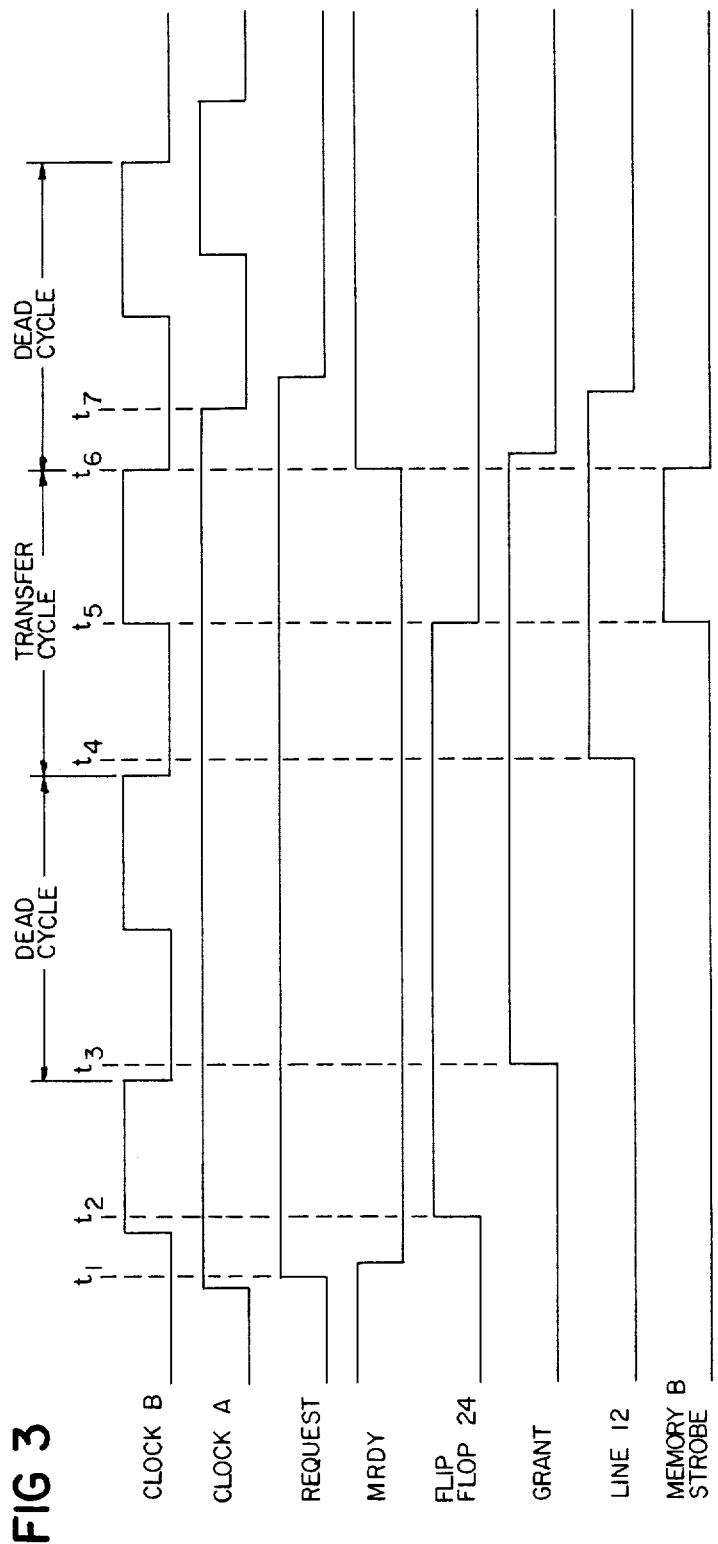
FIG. 3 is a timing chart of signals corresponding to the steps in the receipt and processing of a request by one processor for access to the other's memory.

Referring to FIGS. 2 and 3, when microprocessor A needs to use memory B, it issues a memory B address on local address bus A. Decoder A, recognizing the memory B address, begins to provide a request signal at time $t_1$ over line 16. NAND gate 22 (triggered by the request signal) promptly stops providing a signal (which it had previously been sending) to the memory ready (MRDY) input of microprocessor A, thereby telling microprocessor A to wait until the request can be satisfied. Microprocesor A waits by fixing its internal clock A (which normally switches between high and low values periodically) at a high value beginning the next time the high value is reached. The timing of the remaining steps in satisfying the request is controlled by the pulses of internal clock B applied to the clock inputs of flip-flops 24, 28, 30, 32.

The request signal on line 16 causes flip-flop 24 to switch to a high state at time $t_2$ (i.e., promptly after the next transition to a high state occurs on clock B) thereby telling microprocessor B (via line 26 to the DMA pin of microprocessor B) to release local bus B at the end of the current cycle of clock B. At time $t_3$ (promptly after the next transition to a low state of clock B), microprocessor B disconnects itself from local bus B (by causing its address and data bus drivers to go to a high impedance) and issues a grant signal over line 18, indicating to bus controller 14 that local bus B is available and causing XCVR $B_L$ to disconnect microprocessor B from local bus B. At time $t_4$ (i.e., immediately after the next transition of clock B to a low state), flip flop 32 changes to a high state (because of a signal received from AND gate 34) and triggers transceivers $A_C$ and $B_C$ (via line 12) to open connecting bus 10 to the transfer of an address and a piece of data. Then, at time $t_5$ (i.e., upon the next transition of clock B to a high state), a signal is provided from gate 42 activating memory B to accept or provide the data, and the request signal is removed from line 16 by the transition of flip-flop 24 to a low state (triggered from the output of flip-flop 32), thereby permitting transfer of only one piece of data per request.

At time $t_6$ (when clock B returns to a low state), gate 42 ceases to provide a memory B enabling signal, and the memory ready signal (MRDY) to microprocessor B is reestablished by gate 22 (because gate 38, having determined from flip-flops 28 and 30 that the request has been satisfied, ceases to provide a signal to gate 22), indicating to microprocessor A that its request has been satisfied and it can restart its internal clock A.

Then microprocessor B, having had its DMA input deactivated (by the state change of flip-flop 24 at time $t_5$), withdraws the grant signal from line 18, indicating that it is ready to reassert control of local bus B. At time $t_7$, the operation of clock A is reestablished by a down transition which causes flip-flops 24, 28, 30 and 32 to be reset. Flip-flop 32 and line 12 promptly change to a low state, triggering transceivers $A_C$ and $B_C$ to close connecting bus 10, ending the processing of microprocessor A's request. Microprocessors A and B then continue to operate using their respective memories A and B, until, when either microprocessor A or B requests access to the other's memory, the request is satisfied in the same manner.

Arbitrate logic 60 constantly samples the MRDY inputs of microprocessors A and B, and, when both are deactivated (indicating that a stalemate has resulted from simultaneous access requests issued by both processors), logic 60 sends a signal on line 12 to open connecting bus 10 and a signal to XCVR $B_L$ to disconnect local bus B to enable the data to pass between microprocessor A and memory B, and sends a signal to gate 22 which then signals microprocessor A that the request has been satisfied. Microprocessor B then has its request satisfied.

Other embodiments are within the following claims.

I claim:

1. Apparatus for regulating access by each of a plurality of asynchronous data processors to each of a plurality of memories, each of said processors being associated with one of said memories, each of said processors needing access to its associated said memory and to said memory associated with each other of said processors, said apparatus comprising;

local bus circuitry for carrying data signals and connected to said processors and said associated memories to selectably permit each of said processors to have, or to prevent each of said processors from having, access over said local bus circuitry to said processor's associated memory, connecting bus circuitry for carrying said data signals and connected to said processors and said associated memories to selectably permit each of said processors to have, or prevent each of said processors from having, direct access over said local bus circuitry to said memory associated with each other of said processors for reading and writing, and control circuitry responsive to said processors and connected to trigger said local and connecting bus circuitries to give each of said processors making a request access over said connecting bus circuitry for reading and writing said data signals directly between said requesting processor and said memory associated with one other of said processors, and to give each of said processors access over said local bus circuitry to its associated memory except while access to said associated memory is being given to another of said processors.

2. The apparatus of claim 1 wherein each of said processors has an associated internal control clock, and said control circuitry comprises hold triggering circuitry connected to said processor to stop said internal control clock of said processor making said request, until said request has been satisfied, and disconnect triggering circuitry connected to cause said processor whose associated said memory is the subject of said request to disconnect itself from said local bus circuitry and to continue to operate its said internal control clock to provide timing control pulses to said control circuitry.

3. The apparatus of claim 2 wherein said control circuitry further comprises timing circuitry connected to said processor to activate said connecting bus circuitry at least during part of the time when said internal control clock of said processor making said request is stopped and said processor whose associated said memory is the subject of said request is disconnected from said local bus circuitry.

4. The apparatus of claim 1 wherein each of said processors has a direct memory access pin and a hold pin, and wherein said control circuitry is connected to said direct memory access and hold pins to provide, when said request is made, a signal to said direct memory access pin of said processor whose said associated memory is the subject of said request to cause said processor to disconnect itself from said local bus circuitry, and a signal to said hold pin of said processor making said request to cause said processor to wait until said request has been satisfied.

5. The apparatus of claim 1 further comprising arbitrate circuitry connected to said processors to cause said control circuitry to satisfy simultaneously issued said requests of more than one of said processors in a predetermined order.

6. The apparatus of claim 5 wherein said arbitrate circuitry comprises .

sampling circuitry connected to said processor to provide a signal when said simultaneously issued said requests occur, bus enabling circuitry connected to said sampling circuitry for satisfying said request of one of said processors, and reporting circuitry connected to said processor for signaling said one of said processors when its said request has been satisfied to cause its associated said memory to be made available to satisfy said request of another one of said processors.

7. The apparatus of claims 1, 2, 3, 4, 5 or 6 wherein there are two or said processors and two of said memories.

8. The method of regulating access by each of a plurality of asynchronous data processors to each of a plurality of memories, each of said processors being associated, through local bus circuitry, with one of said memories, each of said processors needing access to its associated said memory and access, through connecting bus circuitry, to said memory associated with each other of said processors, said method comprising:

signaling a first one of said processors requesting said access to said memory associated with a second one of said processors to wait until its request has been satisfied, signaling said second one of said processors to disconnect itself from said local bus circuitry, and opening said connecting bus circuitry, during at least part of the time when said first one of said processors is waiting and said second one of said processors has disconnected itself, to permit said first one of said processors to have said access to said memory associated with said second one of said processors for reading and writing.

9. The method of claim 8 further comprising monitoring said processors to determine when at least two of said processors make simultaneous said requests, and permitting said simultaneously requesting processors to have said access in a predetermined order.

* * * * *